(12) United States Patent
Yu et al.

(10) Patent No.: US 8,318,361 B2
(45) Date of Patent: Nov. 27, 2012

(54) GEL POLYMER ELECTROLYTE AND ELECTROCHEMICAL DEVICE COMPRISING THE SAME

(75) Inventors: Sung-Hoon Yu, Daejeon (KR); Jeong-Ju Cho, Daejeon (KR); Soo-Jin Kim, Daejeon (KR); Soo-Hyun Ha, Daejeon (KR)

(73) Assignee: LG Chem, Ltd. (KR)

( * ) Notice: Subject to any disclaimer, the term of this patent is extended or adjusted under 35 U.S.C. 154(b) by 705 days.

(21) Appl. No.: 12/310,771

(22) PCT Filed: Sep. 7, 2007

(86) PCT No.: PCT/KR2007/004325
§ 371 (c)(1),
(2), (4) Date: Aug. 26, 2009

(87) PCT Pub. No.: WO2008/030058
PCT Pub. Date: Mar. 13, 2008

(65) Prior Publication Data
US 2009/0317723 A1    Dec. 24, 2009

(30) Foreign Application Priority Data

Sep. 7, 2006    (KR) .................. 10-2006-0086151

(51) Int. Cl.
*H01M 6/14* (2006.01)
(52) U.S. Cl. ........ 429/300; 429/302; 429/189; 429/306; 429/307; 429/338; 429/341; 429/342; 429/343; 429/323; 252/62.2

(58) Field of Classification Search .................. 429/300, 429/302, 189, 306, 307, 338, 341, 342, 343, 429/323; 252/62.2
See application file for complete search history.

(56) References Cited

U.S. PATENT DOCUMENTS

| | | | |
|---|---|---|---|
| 6,509,123 | B1 | 1/2003 | Shibuya et al. |
| 6,562,513 | B1 | 5/2003 | Takeuchi et al. |
| 2002/0028388 | A1 | 3/2002 | Lee |
| 2005/0271948 | A1 | 12/2005 | Kang et al. |

FOREIGN PATENT DOCUMENTS

| | | |
|---|---|---|
| CN | 1310483 A | 8/2001 |
| CN | 1316789 A | 10/2001 |
| JP | 2000-299129 | 10/2000 |
| KR | 102002001921 | 3/2002 |
| KR | 102002009481 | 12/2002 |
| KR | 102005011647 | 12/2005 |

OTHER PUBLICATIONS

International Search Report, PCT/KR2007/004325.

*Primary Examiner* — Laura Weiner
(74) *Attorney, Agent, or Firm* — Lerner, David, Littenberg, Krumholz & Mentlik, LLP

(57) ABSTRACT

Disclosed is a composition for a gel polymer electrolyte, the composition comprising: (i) a cyclic compound as a first crosslinking agent, the cyclic compound containing a cyclic group at the center thereof and having at least three double bonds at the end thereof; (ii) a linear or branched compound as a second crosslinking agent, the linear or branched compound containing an oxyalkylene group at the center thereof and having at least two (meth)acryl groups at the end thereof; (iii) an electrolyte solvent; (iv) an electrolyte salt; and (v) a polymerization initiator. Also, disclosed are a gel polymer electrolyte formed by polymerizing the composition for a gel polymer electrolyte, and an electrochemical device comprising the gel polymer electrolyte.

15 Claims, 1 Drawing Sheet

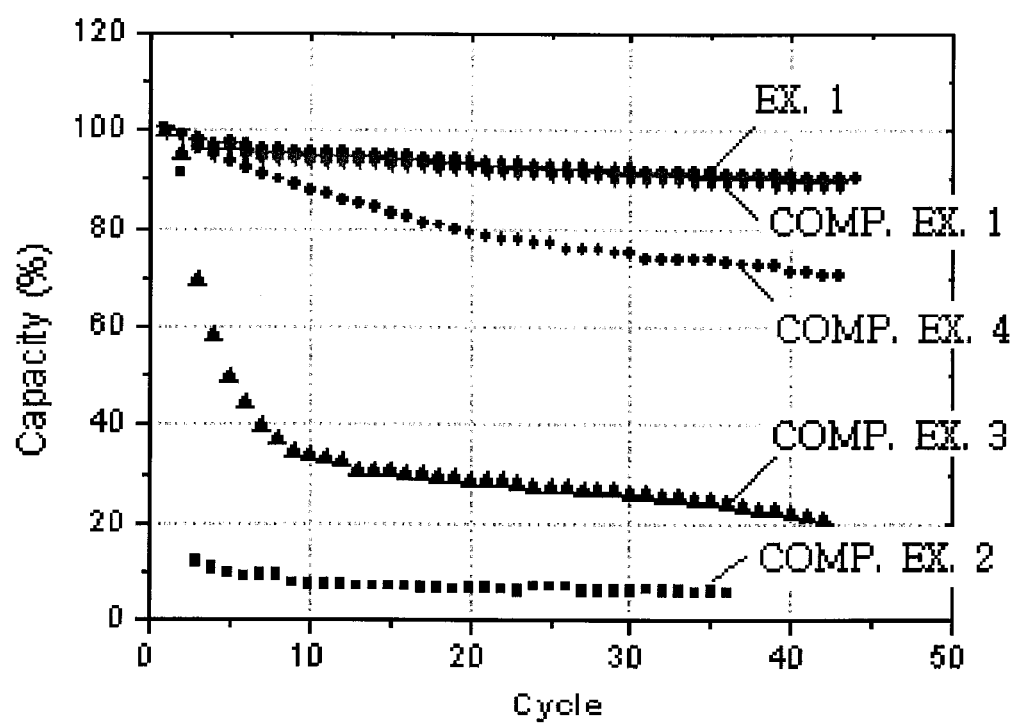

GEL POLYMER ELECTROLYTE AND ELECTROCHEMICAL DEVICE COMPRISING THE SAME

CROSS REFERENCE TO RELATED APPLICATIONS

The present application is a national phase entry under 35 U.S.C. §371 of International Application No. PCT/KR2007/004325, filed Sep. 7, 2007, published in English, which claims the benefit of Korean Patent Application No. 10-2006-0086151, filed Sep. 7, 2006. The disclosures of said applications are incorporated by reference herein.

TECHNICAL FIELD

The present invention relates to a composition for a gel polymer electrolyte, a gel polymer electrolyte obtained by polymerizing the same, and an electrochemical device comprising the same gel polymer electrolyte.

BACKGROUND ART

Recently, there has existed increasing interest in energy storage technology. Batteries have been widely used as energy sources in portable phones, camcorders, notebook computers, PCs and electric cars, resulting in intensive research and development for them. In this regard, electrochemical devices are the subject of great interest. Particularly, development of rechargeable secondary batteries is the focus of attention.

Liquid electrolytes, particularly ion conductive organic liquid electrolytes comprising a salt dissolved in a non-aqueous organic solvent, have been widely used to date as electrolytes for electrochemical devices, such as batteries or electrical dual layer capacitors based on electrochemical reactions.

However, use of such liquid electrolytes may cause degeneration of electrode materials and evaporation of organic solvents, and may be accompanied with a safety-related problem in a battery, including combustion caused by an increase in the ambient temperature and in the temperature of the battery itself. Particularly, a lithium secondary battery has a problem of a so-called swelling phenomenon because of the gas generation in the battery caused by the decomposition of a carbonate-based organic solvent and/or side reactions between an organic solvent and an electrode. Moreover, such side reactions are accelerated under high-temperature storage conditions, thereby increasing the gas generation.

The gas generated continuously as mentioned above causes an increase in the internal pressure of the battery, resulting in deformation of the central portion of a certain surface of the battery, as exemplified by swelling of a prismatic battery in a certain direction. Also, this results in a local difference in the adhesion of the surface of an electrode in the battery, and thus electrochemical reactions cannot occur uniformly on the whole electrode surface and a concentration phenomenon occurs along the thickness direction. Therefore, the battery inevitably undergoes degradation of its quality and safety.

In general, the safety of the battery increases in the order of a liquid electrolyte<a gel polymer electrolyte<a solid polymer electrolyte. However, the quality of the battery decreases in the same order. It is known that batteries using solid polymer electrolytes cannot be commercialized due to such poor battery quality.

However, Sony Corp. (U.S. Pat. No. 6,509,123) and Sanyo Electric Co., Ltd. (Japanese Laid-Open Patent No. 2000-299129) each have recently developed gel polymer electrolytes by using their own unique technological means, and have produced batteries using such gel polymer electrolytes. The batteries have the following characteristics.

Sony's battery uses PVdF-co-HFP (polyvinylidene-co-hexafluoropropylene) as a polymer, and $LiPF_6$ dissolved in EC/PC (ethylene carbonate/propylene carbonate) as an electrolyte. The polymer and the electrolyte are mixed with DMC (dimethyl carbonate) as a solvent, the resultant mixture is coated onto the surface of an electrode, and DMC is allowed to evaporate to provide an electrode onto which a gel polymer is introduced. Then, the electrodes are wound together with a polyolefin-based separator for preventing a short circuit to provide the battery.

Meanwhile, Sanyo's battery is obtained by winding a cathode, an anode and a polyolefin-based separator to provide a cell. Next, PVdF (polyvinylidene fluoride), PMMA (polymethyl methacrylate) PEGDMA (polyethylene glycol dimethyl acrylate), and an initiator are mixed with a suitable organic carbonate mixture, and the mixture is introduced into the preliminarily formed cell. Then, the mixture is crosslinked under an adequate condition to provide a gel polymer electrolyte. In this case, the gel polymer electrolyte is formed in situ inside the battery after assembling the battery.

However, the above batteries have problems in that they are not amenable to mass production, undergo degradation of quality, such as a drop in capacity, and have low mechanical strength.

DISCLOSURE

Technical Problem

It is an object of the present invention to provide a composition for a gel polymer electrolyte, which comprises two kinds of crosslinking agents complementary to each other in order to improve mechanical properties and ion conductivity.

It is another object of the present invention to provide a gel polymer electrolyte obtained by polymerizing the above composition for a gel polymer electrolyte, and an electrochemical device having improved quality by using the above gel polymer electrolyte.

Technical Solution

There is provided a composition for a gel polymer electrolyte, the composition comprising: (i) a cyclic compound as a first crosslinking agent, the cyclic compound containing a cyclic group at the center thereof and having at least three double bonds at the end thereof; (ii) a linear or branched compound as a second crosslinking agent, the linear or branched compound containing an oxyalkylene group at the center thereof and having at least two (meth)acryl groups at the end thereof; (iii) an electrolyte solvent; (iv) an electrolyte salt; and (v) a polymerization initiator.

Also, there is provided a gel polymer electrolyte obtained by polymerizing the above composition for a gel polymer electrolyte.

Further, there is provided an electrochemical device comprising a cathode, an anode and the above gel polymer electrolyte.

DESCRIPTION OF DRAWINGS

FIG. 1 is a graph showing the residual discharge capacity ratio (%) of each of the batteries obtained according to Example 1 and Comparative Examples 1~4 as a function of the cycle life.

BEST MODE

The composition for a gel polymer electrolyte is a precursor solution for a gel polymer electrolyte used as a constitutional element forming an electrochemical device, such as a secondary battery, and is characterized by comprising a first crosslinking agent for increasing the mechanical strength of the gel polymer electrolyte and a second crosslinking agent for improving the ion conductivity of the gel polymer electrolyte.

As the first crosslinking agent, a cyclic compound containing a cyclic group at the center thereof and having at least three double bonds at the end thereof is used. The cyclic compound forms a three-dimensional polymer network via the polymerization of the terminal double bonds. In the polymer network structure formed as mentioned above, the cyclic group forms a hard segment that allows maintenance of a uniform interval between polymer chains, and thus can increase the mechanical strength of the gel polymer electrolyte.

As the second crosslinking agent, a linear or branched compound containing an oxyalkylene group at the center thereof and having at least two (meth)acryl groups at the end thereof is used. The compound forms a planar or network type polymer via the polymerization of the terminal (meth)acryl groups. Herein, since the second crosslinking agent itself is a non-cyclic monomer, the polymer formed by the second crosslinking agent alone is free from any hard segment unlike the polymer formed by the first crosslinking agent alone, and has a low mechanical strength. However, the polar oxyalkylene groups can improve the ion conductivity of the gel polymer electrolyte.

Therefore, in the gel polymer electrolyte formed by using the first crosslinking agent and the second crosslinking agent in an adequate ratio, the second crosslinking agent is linked to the center or an end of the network structure formed by the first crosslinking agent via the polymerization. As a result, the resultant gel polymer electrolyte has excellent mechanical strength and improved ion conductivity.

The cyclic compound as the first crosslinking agent may include a compound represented by the following formula 1, a compound represented by the following formula 2 or a mixture thereof:

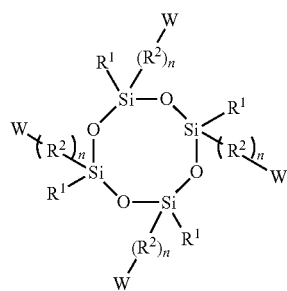

[Formula 1]

wherein $R^1$ is H or a methyl group; $R^2$ is a C1-C12 alkylene group; n is 0 or 1; and W is a vinyl group or (meth)acrylate group.

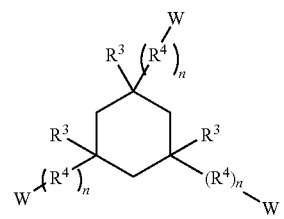

[Formula 2]

wherein $R^3$ is H or a methyl group; $R^4$ is a C1-C12 alkylene group; n is 0 or 1; and W is a vinyl group or (meth)acrylate group.

Non-limiting examples of the compound represented by Formula 1 include 2,4,6,8-tetramethyl-2,4,6,8-tetravinyl-cyclotetrasiloxane, 2,4,6,8-tetramethyl-2,4,6,8-tetraacrylate-cyclotetrasiloxane, or the like. Additionally, non-limiting examples of the compound represented by Formula 2 include 1,3,5-trimethyl-1,3,5-trivinyl-cyclohexane, 1,3,5-trimethyl-1,3,5-triacrylate-cyclohexane, or the like. Such compounds may be used alone or in combination.

The linear or branched compound as the second crosslinking agent includes a compound represented by the following Formula 3:

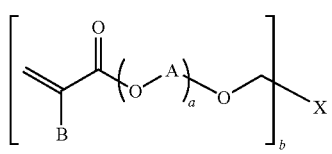

[Formula 3]

wherein A is a C1-C12 alkylene group or C1-C12 haloalkylene group; a is an integer of 0~30; B is H or a methyl group; b is an integer of 2~6; X represents any one of,

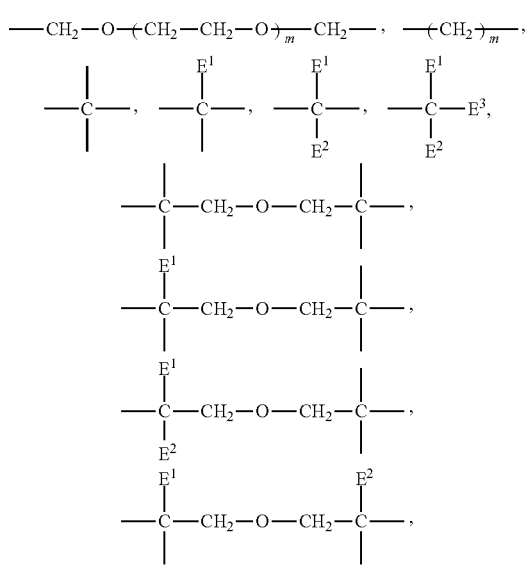

-continued

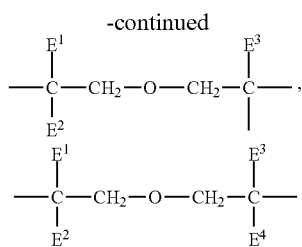

wherein each of E¹, E², E³ and E⁴ independently represents H, a C1-C12 alkyl group, C1-C12 haloalkyl group or C1-C12 hydroxyalkyl group; and m is an integer of 0~30.

Non-limiting examples of the linear or branched compound as the second crosslinking agent include tetraethylene glycol diacrylate, polyethylene glycol diacrylate (molecular weight 50~20,000), 1,4-butanediol diacrylate, 1,6-hexandiol diacrylate, trimethylolpropane triacrylate, trimethylolpropane ethoxylate triacrylate, trimethylolpropane propoxylate triacrylate, ditrimethylolpropane tetraacrylate, pentaerythritol tetraacrylate, pentaerythritol ethoxylate tetraacrylate, dipentaerythritol pentaacrylate, dipentaerythritol hexaacrylate, or the like. Such acrylate compounds may be used alone or in combination.

The cyclic compound as the first crosslinking agent may be used in an amount of 0.01~0.5 wt % based on the weight of the composition for a gel polymer electrolyte. If the cyclic compound as the first crosslinking agent is used in an amount less than 0.01 wt %, the resultant polymer obtained after the polymerization shows insufficient mechanical strength. If the cyclic compound as the first crosslinking agent is used in an amount greater than 0.5 wt %, the resultant polymer structure causes an increase in the electric resistance, resulting in degradation of the quality of the battery using the gel polymer electrolyte.

Additionally, the linear or branched compound as the second crosslinking agent may be used in an amount of 1.5~10 wt % based on the weight of the composition for a gel polymer electrolyte. If the linear or branched compound as the second crosslinking agent is used in an amount less than 1.5 wt %, it is not possible to sufficiently improve the ion conductivity and battery quality. If the linear or branched compound as the second crosslinking agent is used in an amount greater than 10 wt %, it is difficult to increase the mechanical strength of the gel polymer electrolyte.

The composition for a gel polymer electrolyte according to the present invention comprises an electrolyte solvent and an electrolyte salt. The electrolyte solvent is used for dissolving or dissociating the electrolyte salt. There is no particular limitation in the electrolyte solvent, as long as the solvent is currently used as an electrolyte solvent for a battery. Non-limiting examples of such solvents include cyclic carbonates, linear carbonates, lactones, ethers, esters, sulfoxides, acetonitriles, lactams, ketones and/or halogen derivatives thereof. Particular examples of the cyclic carbonates include ethylene carbonate (EC), propylene carbonate (PC), butylene carbonate (BC), fluoroethylene carbonate (FEC), or the like. Particular examples of the linear carbonates include diethyl carbonate (DEC), dimethyl carbonate (DMC), dipropyl carbonate (DPC), ethyl methyl carbonate (EMC), methyl propyl carbonate (MPC), or the like. Particular examples of the lactones include gamma-butyrolactone (GBL) and those of ethers include dibutyl ether, tetrahydrofuran, 2-methyltetrahydrofuran, 1,4-dioxane, 1,2-dimethoxyethane, 1,2-diethoxyethane, or the like. Particular examples of the esters include methyl formate, ethyl formate, propyl formate, methyl acetate, ethyl acetate, propyl acetate, methyl propionate, ethyl propionate, butyl propionate, methyl pivalate, or the like. Additionally, particular examples of the sulfoxides include dimethyl sulfoxide, or the like, and those of the lactams include N-methyl-2-pyrrolidone (NMP), or the like. Further, particular examples of the ketones include polymethylvinyl ketone. Halogen derivatives of the above electrolyte solvents may also be used. Such electrolyte solvents may be used alone or in combination.

There is no particular limitation in the electrolyte salt, as long as the electrolyte salt is one currently used for a non-aqueous electrolyte. Non-limiting examples of the electrolyte salt include salts formed by a combination of: (i) a cation selected from the group consisting of $Li^+$, $Na^+$ and $K^+$; with (ii) an anion selected from the group consisting of $PF_6^-$, $BF_4^-$, $Cl^-$, $Br^-$, $I^-$, $ClO_4^-$, $AsF_6^-$, $CH_3CO_2^-$, $CF_3SO_3^-$, $N(CF_3SO_2)_2^-$ and $C(CF_2SO_2)_3^-$. Such electrolyte salts may be used alone or in combination. Particularly, a lithium salt is preferred.

The composition for a gel polymer electrolyte according to the present invention may comprise a conventional polymerization initiator generally known to those skilled in the art. The polymerization initiator may be used in an amount of 0.01~5 wt % based on the weight of the composition.

Non-limiting examples of the polymerization initiator include organic peroxides or hydroperoxides such as benzoyl peroxide, acetyl peroxide, dilauryl peroxide, di-tert-butyl peroxide, cumyl hydroperoxide, hydrogen peroxide, etc., and azo compounds such as 2,2-azobis(2-cyanobutane), 2,2-azobis(methylbutyronitrile), AIBN(azobis(iso-butyronitrile), AMVN (azobisdimethyl-valeronitrile), etc. Such polymerization initiators are thermally decomposed to form radicals, and react with monomers via free radical polymerization to form a gel polymer electrolyte.

The composition for a gel polymer electrolyte according to the present invention may further comprise other additives known to those skilled in the art in addition to the aforementioned components.

The gel polymer electrolyte according to the present invention is obtained by polymerizing the aforementioned composition for a gel polymer electrolyte according to a conventional process known to those skilled in the art. For example, the gel polymer electrolyte according to the present invention may be formed via the in-situ polymerization of the composition for a gel polymer electrolyte inside an electrochemical device.

A preferred embodiment of the method for forming the gel polymer electrolyte comprises the steps of: (a) forming an electrode assembly by winding a cathode, an anode and a separator interposed between the cathode and anode, and introducing the electrode assembly into a casing for an electrochemical device; and (b) injecting the composition for a gel polymer electrolyte according to the present invention into the casing, and carrying out polymerization of the composition to form a gel polymer electrolyte.

The in-situ polymerization inside the electrochemical device may be performed via thermal polymerization. The polymerization time generally ranges from 20 minutes to 12 hours, and the polymerization temperature ranges from 40° C. to 80° C.

The polymerization is carried out preferably under an inert condition. When carrying out the polymerization under an inert condition, reactions between oxygen in the atmosphere functioning as a radical scavenger and radicals are fundamentally inhibited, and thus the extent of the polymerization reaction can be increased to such a degree that any unreacted monomer, i.e., crosslinking agent is substantially free from the reaction system. Therefore, it is possible to prevent degradation of the charge/discharge quality caused by a large amount of the remaining unreacted monomer inside the battery.

As a material for forming such inert conditions, gases known to have low reactivity to those skilled in the art may be used. Particularly, at least one inert gas selected from the group consisting of nitrogen, argon, helium and xenon may be used.

After the polymerization, the gel polymer electrolyte is formed. According to the present invention, a gel polymer crosslinked in the form of a three-dimensional network structure is formed via the bonding between a plurality of double bonds and acryl groups contained in the first crosslinking agent and the second crosslinking agent. Additionally, the gel polymer may be uniformly impregnated with an electrolyte comprising an electrolyte salt dissociated in an electrolyte solvent. The gel polymer electrolyte has excellent mechanical strength, and lithium ions in the electrolyte can be continuously transferred and moved through the polar gel polymer electrolyte, thereby improving the quality of the battery.

The electrochemical device according to the present invention comprises a cathode, an anode, a separator, and a gel polymer electrolyte formed by polymerizing the composition for a gel polymer electrolyte according to the present invention.

The electrochemical device according to the present invention includes all types of devices in which electrochemical reactions are performed. Particular examples of the electrochemical device include all types of primary batteries, secondary batteries, fuel cells, solar cells, capacitors, or the like. Particularly, lithium secondary batteries are preferred, and non-limiting examples of the lithium secondary batteries include lithium metal secondary batteries, lithium ion secondary batteries, lithium polymer secondary batteries or lithium ion polymer secondary batteries.

The electrochemical device may be obtained by using a conventional method known to those skilled in the art. As described above, a preferred embodiment of the method comprises the steps of: (a) introducing an electrode assembly into a casing for an electrochemical device; and (b) injecting the composition for a gel polymer electrolyte according to the present invention into the casing, and carrying out polymerization of the composition to form a gel polymer electrolyte.

Additionally, the electrode used in the electrochemical device may be manufactured by a conventional method known to one skilled in the art. For example, an electrode active material may be mixed with a solvent, and optionally with a binder, a conductive agent and a dispersant, and the mixture is agitated to provide slurry. Then, the slurry is applied onto a metal collector, and the collector coated with the slurry is compressed and dried to provide an electrode.

The electrode active material includes a cathode active material or an anode active material.

Cathode active materials that may be used in the present invention include: lithium transition metal composite oxides, such as $LiM_xO_y$, (M=Co, Ni, Mn, $Co_aNi_bMn_c$) (e.g. lithium manganese composite oxides such as $LiMn_2O_4$, lithium nickel oxides such as $LiNiO_2$, lithium cobalt oxides such as $LiCoO_2$, other oxides obtained by substituting manganese, nickel and cobalt in the above oxides partially with other transition metals, or lithium-containing vanadium oxide, etc.); or calcogenides, such as manganese dioxide, titanium disulfide, molybdenum disulfide, or the like, but are not limited thereto.

Anode active materials that may be used in the present invention include those currently used in anodes for electrochemical devices. Particular examples of the anode active materials include lithium metal, lithium alloys, carbon, petroleum coke, activated carbon, graphite or carbon fiber capable of lithium ion intercalation/deintercalation. Other metal oxides capable of lithium intercalation/deintercalation and having a potential vs. $Li^+/Li$ of less than 2V (for example, $TiO_2$ or $SnO_2$) may also be used. Particularly, carbonaceous materials, such as graphite, carbon fiber or activated carbon, are preferred.

There is no particular limitation in the metallic current collector, as long as the collector is formed of a highly conductive metal, allows easy attachment of slurry of an electrode active material thereto, and has no reactivity in the drive voltage range of the battery. Non-limiting examples of a cathode collector include foil formed of aluminum, nickel or a combination thereof. Non-limiting examples of an anode collector include foil formed of copper, gold, nickel, copper alloys or a combination thereof.

Although there is no particular limitation in the separator that may be used in the present invention, a porous separator is preferred, and particular examples thereof include polypropylene-based, polyethylene-based, and polyolefin-based porous separators. To apply such separators to batteries, lamination or stacking processes between separators and electrodes and folding processes may be used in addition to widely used winding processes.

Further, although there is no particular limitation in the outer shape of the electrochemical device according to the present invention, the electrochemical device may have a cylindrical shape using a can, a prismatic shape, a pouch-like shape or a coin-like shape.

Reference will now be made in detail to the preferred embodiments of the present invention. It is to be understood that the following examples are illustrative only and the present invention is not limited thereto.

Example 1

Preparation of Composition for Gel Polymer Electrolyte

First, 1M $LiPF_6$ was dissolved into an electrolyte solvent containing ethylene carbonate (EC), propylene carbonate (PC) and dimethyl carbonate (DMC) in a weight ratio of 2:1:7 (EC:PC:DMC) to provide an electrolyte. Next, 97 wt % of the electrolyte was mixed with 0.5 wt % of 2,4,6,8-tetramethyl-2,4,6,8-tetravinyl-cyclotetra siloxane (Formula 4) as a first crosslinking agent, 1.5 wt % of dipentaerythritol pentaacrylate (Formula 5) as a second crosslinking agent, and 1 wt % of AIBN as a polymerization initiator to provide a composition for a gel polymer electrolyte.

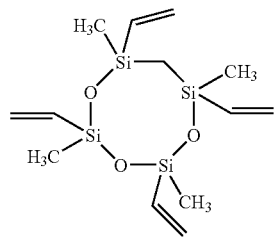

[Formula 4]

-continued

[Formula 5]

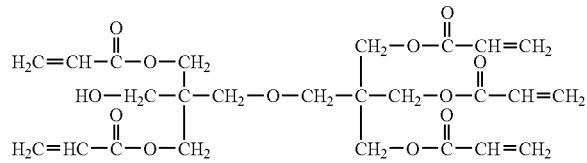

Manufacture of Cathode

To N-methyl-2-pyrrolidone (NMP) as a solvent, 94 wt % of $LiCoO_2$ as a cathode active material, 3 wt % of carbon black as a conductive agent and 3 wt % of PVdF as a binder were added to form slurry for a cathode. The slurry was coated on Al foil having a thickness of about 20 μm as a cathode collector, and then dried to form a cathode. Then, the cathode was subjected to roll press.

Manufacture of Anode

To NMP as a solvent, 96 wt % of carbon powder as an anode active material, 3 wt % of polyvinylidene fluoride (PVdF) as a binder and 1 wt % of carbon black as a conductive agent were added to form mixed slurry for an anode. The slurry was coated on Cu foil having a thickness of about 10 μm as an anode collector, and then dried to form an anode. Then, the anode was subjected to roll press.

Manufacture of Battery

The cathode, anode and a polypropylene/poly ethylene/polypropylene (PP/PE/PP) tri-layer separator were used to provide a battery. The composition for a gel polymer electrolyte obtained as described above was injected into the assembled battery and the resultant battery was stored for 3 hours. After 3 hours, the composition was subjected to polymerization under a nitrogen atmosphere at 80° C. for 4 hours to provide a finished battery.

Comparative Example 1

A battery was provided in the same manner as described in Example 1, except that 2 wt % of dipentaerythritol pentaacrylate (Formula 5) was used alone instead of 0.5 wt % of 2,4,6,8-tetramethyl-2,4,6,8-tetravinyl-cyclotetrasiloxane (Formula 4) as a first crosslinking agent and 1.5 wt % of dipentaerythritol pentaacrylate (Formula 5) as a second crosslinking agent.

Comparative Example 2

A battery was provided in the same manner as described in Example 1, except that 10 wt % of 2,4,6,8-tetramethyl-2,4,6,8-tetravinyl-cyclotetrasiloxane (Formula 4) was used alone instead of 0.5 wt % of 2,4,6,8-tetramethyl-2,4,6,8-tetravinyl-cyclotetrasiloxane (Formula 4) as a first crosslinking agent and 1.5 wt % of dipentaerythritol pentaacrylate (Formula 5) as a second crosslinking agent.

Comparative Example 3

A battery was provided in the same manner as described in Example 1, except that 1 wt % of 2,4,6,8-tetramethyl-2,4,6,8-tetravinyl-cyclotetrasiloxane (Formula 4) and 1 wt % of dipentaerythritol pentaacrylate (Formula 5) were used, instead of 0.5 wt % of 2,4,6,8-tetramethyl-2,4,6,8-tetravinyl-cyclotetrasiloxane (Formula 4) as a first crosslinking agent and 1.5 wt % of dipentaerythritol pentaacrylate (Formula 5) as a second crosslinking agent.

Comparative Example 4

A battery was provided in the same manner as described in Example 1, except that neither crosslinking agent nor polymerization initiator was used.

Experimental Example 1

Evaluation of Quality of Batteries

The residual discharge capacity ratio (%) of each of the batteries according to Example 1 and Comparative Examples 1~4 was measured as a function of the cycle life. The results are shown in FIG. 1.

Each battery was charged to 4.2V at 1 C, and charged under a constant-voltage condition to a current corresponding to 5% of the battery capacity. Then, each battery was discharged to 3V at 1 C. Such charge/discharge cycle was taken as the first cycle, and the discharge capacity after repeating a number of cycles was expressed based on the discharge capacity of the first cycle.

As shown in FIG. 1, the battery according to Example 1 shows quality similar to the quality of the battery according to Comparative Example 1, but shows significantly improved quality as compared to the batteries according to Comparative Examples 2~4. Therefore, it can be seen from the above results that the combination of the cyclic compound as the first crosslinking agent with the linear or branched compound as the second crosslinking agent, each used in the above range according to the present invention, can improve the quality of the battery. Additionally, if the conditions, including the cathode, anode and separator, other than the electrolyte are the same, a battery shows quality significantly depending on the ion conductivity of an electrolyte. Therefore, it can be seen that the gel polymer electrolyte according to the present invention shows improved ion conductivity.

Experimental Example 2

Measurement of Mechanical Properties

Each gel polymer obtained by thermal curing of each of the gel polymer electrolyte compositions according to Example 1 and Comparative Examples 1~3 was subjected to a test for determining the force required for 3 mm deformation. The results are shown in the following Table 1. The force measured in this example allows only relative comparison, and thus the results are shown without any specific unit.

TABLE 1

| | Ex. 1 | Comp. Ex. 1 | Comp. Ex. 2 | Comp. Ex. 3 |
|---|---|---|---|---|
| Measured value | 30 | 26 | 70 | 31 |

As shown in Table 1, the gel polymer electrolyte using an increased amount of the cyclic compound as the first crosslinking agent shows more improved mechanical properties. However, considering the battery quality, the cyclic compound is used preferably in an amount of at most 0.5 wt % based on the composition for a gel polymer electrolyte.

INDUSTRIAL APPLICABILITY

In the gel polymer electrolyte formed by using the first crosslinking agent and the second crosslinking agent according to the present invention, the second crosslinking agent is linked to the center or an end of the network structure formed by the first crosslinking agent via the polymerization. Thus, the resultant gel polymer electrolyte has excellent mechanical strength and improved ion conductivity. As a result, the electrochemical device using the gel polymer electrolyte can provide improved quality.

The invention claimed is:

1. A composition for a gel polymer electrolyte, the composition comprising:
   (i) a cyclic compound as a first crosslinking agent, the cyclic compound containing a cyclic group at the center thereof and having at least three double bonds at the end thereof;
   (ii) a linear or branched compound as a second crosslinking agent, the linear or branched compound containing an oxyalkylene group at the center thereof and having at least two (meth)acryl groups at the end thereof;
   (iii) an electrolyte solvent;
   (iv) an electrolyte salt; and
   (v) a polymerization initiator,
wherein (i) the cyclic compound is a compound represented by Formula 1 or Formula 2 below or a mixture thereof:

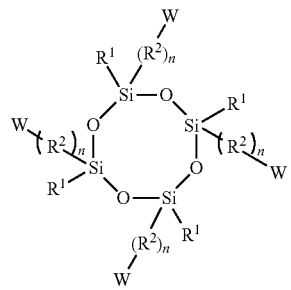

Formula 1 wherein $R^1$ is H or a methyl group; $R^2$ is a C1-C12 alkylene group; n is 0 or 1; and W is a vinyl group or (meth)acrylate group,

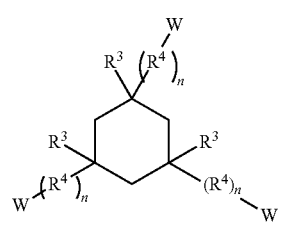

Formula 2 wherein $R^3$ is H or a methyl group; $R^4$ is a C1-C12 alkylene group; n is 0 or 1; and W is a vinyl group or (meth)acrylate group;

(ii) the linear or branched compound is a compound represented by Formula 3 below:

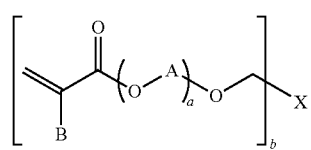

Formula 3 wherein A is a C1-C12 alkylene group or C1-C12 haloalkylene group; a is an integer of 0 to 30; B is H or a methyl group; b is an integer of 2 to 6; X represents any one of

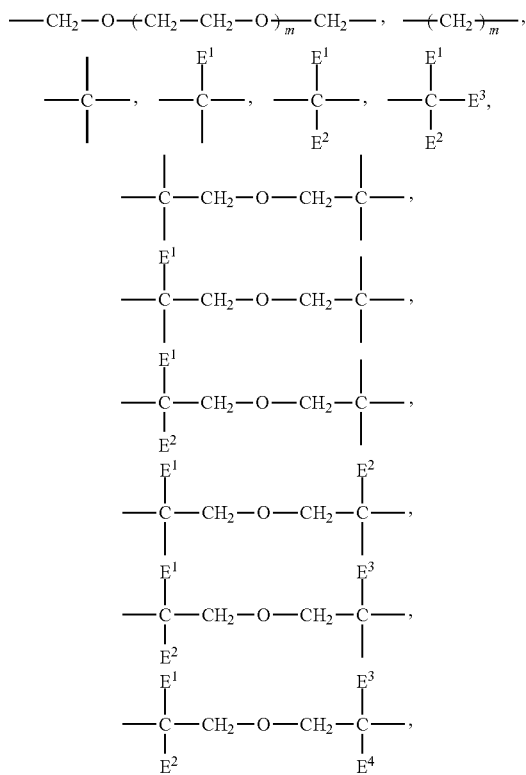

wherein each of $E^1$, $E^2$, $E^3$ and $E^4$ independently represents H, a C1-C12 alkyl group, C1-C12 haloalkyl group or C1-C12 hydroxyalkyl group; and m is an integer of 0 to 30, and
   (v) the polymerization initiator is selected from the group consisting of benzoyl peroxide, acetyl peroxide, dilauryl peroxide, di-tert-butyl peroxide, cumyl hydroperoxide, hydrogen peroxide, 2,2-zaobis(2-cyanobutane), 2,2-azobis(methylbutyronitrile), AIBN (azobis(iso-butyronitrile)) and AMVN (zaobisdimethyl-valeronitrile).

2. The composition for a gel polymer electrolyte as claimed in claim 1, wherein the cyclic compound as the first crosslinking agent is at least one compound selected from the group consisting of 2,4,6,8-tetramethyl-2,4,6,8-tetravinyl-cyclotetrasiloxane, 2,4,6,8-tetramethyl-2,4,6,8-tetraacrylate-cyclotetrasiloxane, 1,3,5-trimethyl-1,3,5-trivinyl-cyclohexane and 1,3,5-trimethyl-1,3,5-triacrylate-cyclohexane.

3. The composition for a gel polymer electrolyte as claimed in claim 1, wherein the linear or branched compound as the second crosslinking agent is at least one compound selected from the group consisting of tetraethylene glycol diacrylate, polyethylene glycol diacrylate (molecular weight 50 to 20,000), 1,4-butanediol diacrylate, 1,6-hexandiol diacrylate, trimethylolpropane triacrylate, trimethylolpropane ethoxylate triacrylate, trimethylolpropane propoxylate triacrylate, ditrimethylolpropane tetraacrylate, pentaerythritol tetraacrylate, pentaerythritol ethoxylate tetraacrylate, dipentaerythritol pentaacrylate and dipentaerythritol hexaacrylate.

4. The composition for a gel polymer electrolyte as claimed in claim 1, wherein the cyclic compound as the first crosslinking agent is used in an amount of 0.01 to 0.5 wt % based on the weight of the composition for a gel polymer electrolyte.

5. The composition for a gel polymer electrolyte as claimed in claim 1, wherein the linear or branched compound as the second crosslinking agent is used in an amount of 1.5 to 10 wt % based on the weight of the composition for a gel polymer electrolyte.

6. The composition for a gel polymer electrolyte as claimed in claim 1, wherein the electrolyte solvent is at least one solvent selected from the group consisting of cyclic carbonates, linear carbonates, lactones, ethers, esters, sulfoxides, acetonitriles, lactams, ketones and halogen derivatives thereof.

7. The composition for a gel polymer electrolyte as claimed in claim 1, wherein the electrolyte salt is formed by a combination of:
   (i) a cation selected from the group consisting of Li$^+$, Na$^+$ and K$^+$; with
   (ii) an anion selected from the group consisting of PF$_6^-$, BF$_4^-$, Cl$^-$, Br$^-$, I$^-$, ClO$_4^-$, AsF$_6^-$, CH$_3$CO$_2^-$, CF$_3$SO$_3^-$, N(CF$_3$SO$_2$)$_2^-$ and C(CF$_2$SO$_2$)$_3^-$.

8. A gel polymer electrolyte formed by polymerizing a composition for a gel polymer electrolyte, the composition comprising:
   (i) a cyclic compound as a first crosslinking agent, the cyclic compound containing a cyclic group at the center thereof and having at least three double bonds at the end thereof;
   (ii) a linear or branched compound as a second crosslinking agent, the linear or branched compound containing an oxyalkylene group at the center thereof and having at least two (meth)acryl groups at the end thereof;
   (iii) an electrolyte solvent;
   (iv) an electrolyte salt; and
   (v) a polymerization initiator,
wherein (i) the cyclic compound is a compound represented by Formula 1 or Formula 2 below or a mixture thereof:

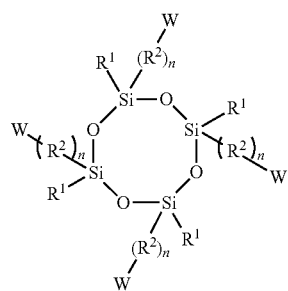

Formula 1 wherein R$^1$ is H or a methyl group; R$^2$ is a C1-C12 alkylene group; n is 0 or 1; and W is a vinyl group or (meth) acrylate group,

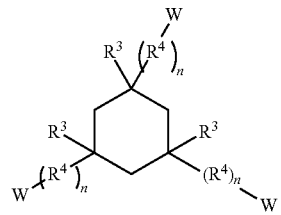

Formula 2 wherein R$^3$ is H or a methyl group; R$^4$ is a C1-C12 alkylene group; n is 0 or 1; and W is a vinyl group or (meth) acrylate group, ii) the linear or branched compound is a compound represented by Formula 3 below:

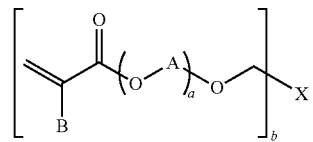

Formula 3 wherein A is a C1-C12 alkylene group or C1-C12 haloalkylene group; a is an integer of 0 to 30; B is H or a methyl group; b is an integer of 2 to 6; X represents any one of

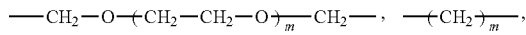
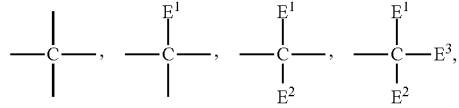
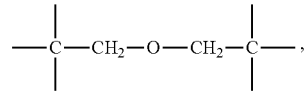
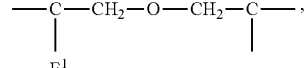
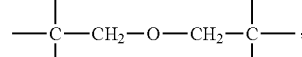
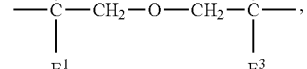

wherein each of E$^1$, E$^2$, E$^3$ and E$^4$ independently represents H, a C1-C12 alkyl group, C1-C12 haloalkyl group or C1-C12 hydroxyalkyl group; and m is an integer of 0 to 30, and (v) the polymerization initiator is selected from the group consisting of benzoyl peroxide, acetyl peroxide, dilauryl peroxide, di-tert-butyl peroxide, cumyl hydroperoxide, hydrogen peroxide, 2,2-zaobis(2-cyanobutane), 2,2-azobis(methylbutyronitrile), AIBN (azobis(iso-butyronitrile)) and AMVN (zaobisdimethyl-valeronitrile).

9. The gel polymer electrolyte as claimed in claim 8, which is formed via in-situ polymerization inside an electrochemical device.

10. An electrochemical device comprising a cathode, an anode and the gel polymer electrolyte as defined in claim 8.

11. The electrochemical device as claimed in claim 10, which is a lithium secondary battery.

12. The gel polymer electrolyte as claimed in claim 8, wherein the cyclic compound as the first crosslinking agent is at least one compound selected from the group consisting of 2,4,6,8-tetramethyl-2,4,6,8-tetravinyl-cyclotetrasiloxane, 2,4, 6,8-tetramethyl-2,4,6,8-tetraacrylate-cyclotetrasiloxane, 1,3,5-trimethyl-1,3,5-trivinyl-cyclohexane and 1,3,5-trimethyl-1,3,5-triacrylate-cyclohexane.

13. The gel polymer electrolyte as claimed in claim 8, wherein the linear or branched compound as the second crosslinking agent is at least one compound selected from the group consisting of tetraethylene glycol diacrylate, polyethylene glycol diacrylate (molecular weight 50 to 20,000), 1,4-butanediol diacrylate, 1,6-hexandiol diacrylate, trimethylolpropane triacrylate, trimethylolpropane ethoxylate triacrylate, trimethylolpropane propoxylate triacrylate, ditrimethylolpropane tetraacrylate, pentaerythritol tetraacrylate, pentaerythritol ethoxylate tetraacrylate, dipentaerythritol pentaacrylate and dipentaerythritol hexaacrylate.

14. The gel polymer electrolyte as claimed in claim 8, wherein the cyclic compound as the first crosslinking agent is present in an amount of 0.01 to 0.5 wt % based on the weight of the composition for a gel polymer electrolyte.

15. The gel polymer electrolyte as claimed in claim 8, wherein the linear or branched compound as the second crosslinking agent is present in an amount of 1.5 to 10 wt % based on the weight of the composition for a gel polymer electrolyte.

* * * * *